US009169119B2

(12) United States Patent
Kim et al.

(10) Patent No.: US 9,169,119 B2
(45) Date of Patent: Oct. 27, 2015

(54) APPARATUS AND METHOD FOR ON-BOARD PRODUCTION OF FUEL FOR A FUEL CELL CAR

(71) Applicants: Hyundai Motor Company, Seoul (KR); The Industry & Academic Cooperation in Chungnam National University (IAC), Daejeon (KR)

(72) Inventors: Chang Ho Kim, Incheon (KR); In Chul Hwang, Seoul (KR); Hong Youl Ryu, Chungcheongbuk-do (KR); Jong Hyeon Lee, Daejeon (KR); Seong Seok Cho, Daejeon (KR); Kie Seo Bae, Daejeon (KR); Moon Hee Han, Daejeon (KR)

(73) Assignees: The Industry & Academic Cooperation in Chungnam National University (IAC), Daejeon (KR); Hyundai Motor Company, Seoul (KR)

( * ) Notice: Subject to any disclaimer, the term of this patent is extended or adjusted under 35 U.S.C. 154(b) by 336 days.

(21) Appl. No.: 13/714,190

(22) Filed: Dec. 13, 2012

(65) Prior Publication Data

US 2014/0119999 A1      May 1, 2014

(30) Foreign Application Priority Data

Oct. 26, 2012    (KR) ........................ 10-2012-0120006

(51) Int. Cl.
*C01B 3/08* (2006.01)
(52) U.S. Cl.
CPC ... *C01B 3/08* (2013.01); *Y02E 60/36* (2013.01)

(58) Field of Classification Search
CPC .......................................................... C10B 3/08
USPC ............................................................. 48/61
See application file for complete search history.

(56) References Cited

U.S. PATENT DOCUMENTS

| 7,534,275 B2 * | 5/2009 | Tonca ............................... 48/61 |
| 2002/0081235 A1 * | 6/2002 | Baldwin et al. ............... 422/105 |
| 2004/0131541 A1 * | 7/2004 | Andersen ..................... 423/657 |

FOREIGN PATENT DOCUMENTS

| JP | 2007-091513 A | 4/2007 |
| KR | 10-2003-0067753 A | 8/2003 |
| KR | 10-2007-0076518 A | 7/2007 |
| KR | 10-2008-0030919 | 4/2008 |
| KR | 10-2008-0030919 A | 4/2008 |

* cited by examiner

*Primary Examiner* — Matthew Merkling
(74) *Attorney, Agent, or Firm* — Mintz Levin Cohn Ferris Glovsky and Popeo, P.C.; Peter F. Corless

(57) ABSTRACT

The present disclosure provides an apparatus for producing fuel for a fuel cell car which includes: a main reaction chamber including an aluminum coil and configured to produce gas; a sub-chamber including a sodium aqueous solution, the sub-chamber in fluid communication with the main reaction chamber to communicate the produced gas; a circulation pump configured to supply a sodium hydroxide aqueous solution in the sub-chamber to the main reaction chamber when producing the fuel, and further configured to return the sodium hydroxide aqueous solution in the main reaction chamber to the sub-chamber when stopping production of the fuel; and a separator configured to separate hydrogen gas from the produced gas, and supply the hydrogen gas to a fuel cell.

10 Claims, 3 Drawing Sheets

APPARATUS AND METHOD FOR ON-BOARD PRODUCTION OF FUEL FOR A FUEL CELL CAR

CROSS-REFERENCE TO RELATED APPLICATION

This application claims under 35 U.S.C. §119(a) the benefit of Korean Patent Application No. 10-2012-0120006, filed on Oct. 26, 2012, the entire contents of which are incorporated herein by reference.

BACKGROUND (a) Technical Field

The present invention relates to an apparatus for producing fuel for a fuel cell car, and more particularly, to an apparatus that produces hydrogen in a fuel cell car without separately receiving hydrogen.

(b) Background Art

In view of the growing problems with global warming and the high price of oil, there is a need to develop technologies based on highly efficient, sustainable sources of energy. In particular, there is a need to develop vehicle technologies based on such sustainable sources of energy that also have the ability to reduce or eliminate the production of greenhouse gases.

Accordingly, many manufacturers have made an effort to develop vehicle technologies based on a secondary battery and a fuel cell as an energy source. In particular, with respect to the fuel cell, the majority of current research is focused on the hydrogen supply system and the cells that make up the fuel cell. Currently, a conventional hydrogen supply system is based on a super high pressure hydrogen tank, which is generally a container capable of holding compressed hydrogen at a pressure of not less than 700 bar. Consequently, there is no need to provide sub-devices in the hydrogen supply system, which results in a relatively simple hydrogen delivery system design. Unfortunately, such a hydrogen supply system has several significant disadvantages. For example, there are safety concerns with respect to accidents involving vehicles that contain hydrogen storage tanks with hydrogen under such high-pressures. Additionally, such hydrogen supply systems require a nationwide infrastructure capable of supplying hydrogen for use in such hydrogen supply systems in a vehicle, which is likely to take up to 20 years to develop. Furthermore, since the hydrogen supply system delivers hydrogen under pressure, the components of the fuel cell must be made from composites able to withstand this pressure. This has the disadvantage of increasing the cost required to produce the fuel cell. Accordingly, there is a need to develop technologies that enable hydrogen to be produced on board a vehicle.

SUMMARY OF THE DISCLOSURE

The present invention provides an apparatus for producing hydrogen fuel on-board of a fuel cell car that can be mounted on the vehicle, and the speed of producing hydrogen to be controlled. Furthermore, the present invention provides an apparatus for producing hydrogen fuel for a fuel cell car that makes it possible to easily and safely fill and discharge fuel, which is important to consider when producing hydrogen from a chemical reaction, and also makes it possible to easily control the reaction when stopping/restarting the production of hydrogen.

In one exemplary embodiment, the present invention provides an apparatus for producing fuel for a fuel cell car, which includes: a main reaction chamber that stores an aluminum coil; a sub-chamber that contains a sodium aqueous solution and is connected with the main reaction chamber to pass a produced gas; a circulation pump that supplies a sodium hydroxide aqueous solution in the sub-chamber to the main reaction chamber when producing fuel, and returns the sodium hydroxide aqueous solution in the main reaction chamber to the sub-chamber when stopping the producing; and a separator that is connected with the main reaction chamber or the sub-chamber, separates the hydrogen gas from the other gases in the produced gas, and supplies the hydrogen gas to a fuel cell.

The main reaction chamber may include a winding member that winds a coil while rotating at the center and a restriction frame that restricts the thickness of the wound coil, formed in a frame shape surrounding the edge of the winding member.

The apparatus may further include a supplier that receives and bends an aluminum panel in a zigzag shape, and supplies the bent aluminum panel to the main reaction chamber. The supplier may include two gears and bend the cross-section of the aluminum panel in a zigzag shape through the two gears.

The main reaction chamber may include a winding member that winds a coil while rotating at the center, and the two gears of the supplier and the winding part may operate together by power transmitted from a driving unit.

An injection nozzle may be formed around the winding member on the top of the main reaction chamber and may be connected with a circulation pump to receive a sodium hydrogen aqueous solution and to inject into the main reaction chamber toward the aluminum coil, from above.

A separation wall may be disposed between the main reaction chamber and the sub-chamber, and flow holes may be formed at the upper portion of the separation wall such that the produced gases in the main reaction chamber and the sub-chamber flow to each other and the pressures in the chambers may be kept balanced.

Water that is a byproduct from a fuel cell may return into the separator, and the remaining gas in the produced gas may be separated from the hydrogen gas by liquefying and supplied with the water into the circulation pump.

The separator may have a refrigerant line for liquefying the remaining gas, the main reaction chamber may have a cooling line for cooling the inside, and the refrigerant line and the cooling line may be connected with each other such that a refrigerant circulates. The cooling line may be a pipe shape that circulates along the inner wall of the main reaction chamber.

The aluminum coil in the main reaction chamber may be replaceable and the sodium hydrogen aqueous solution in the sub-chamber may be replaceable.

BRIEF DESCRIPTION OF THE DRAWINGS

The above and other features of the present invention will now be described in detail with reference to certain exemplary embodiments thereof illustrated by the accompanying drawings which are given hereinbelow by way of illustration only, and thus are not limitative of the present invention, and wherein.

Figure 1:
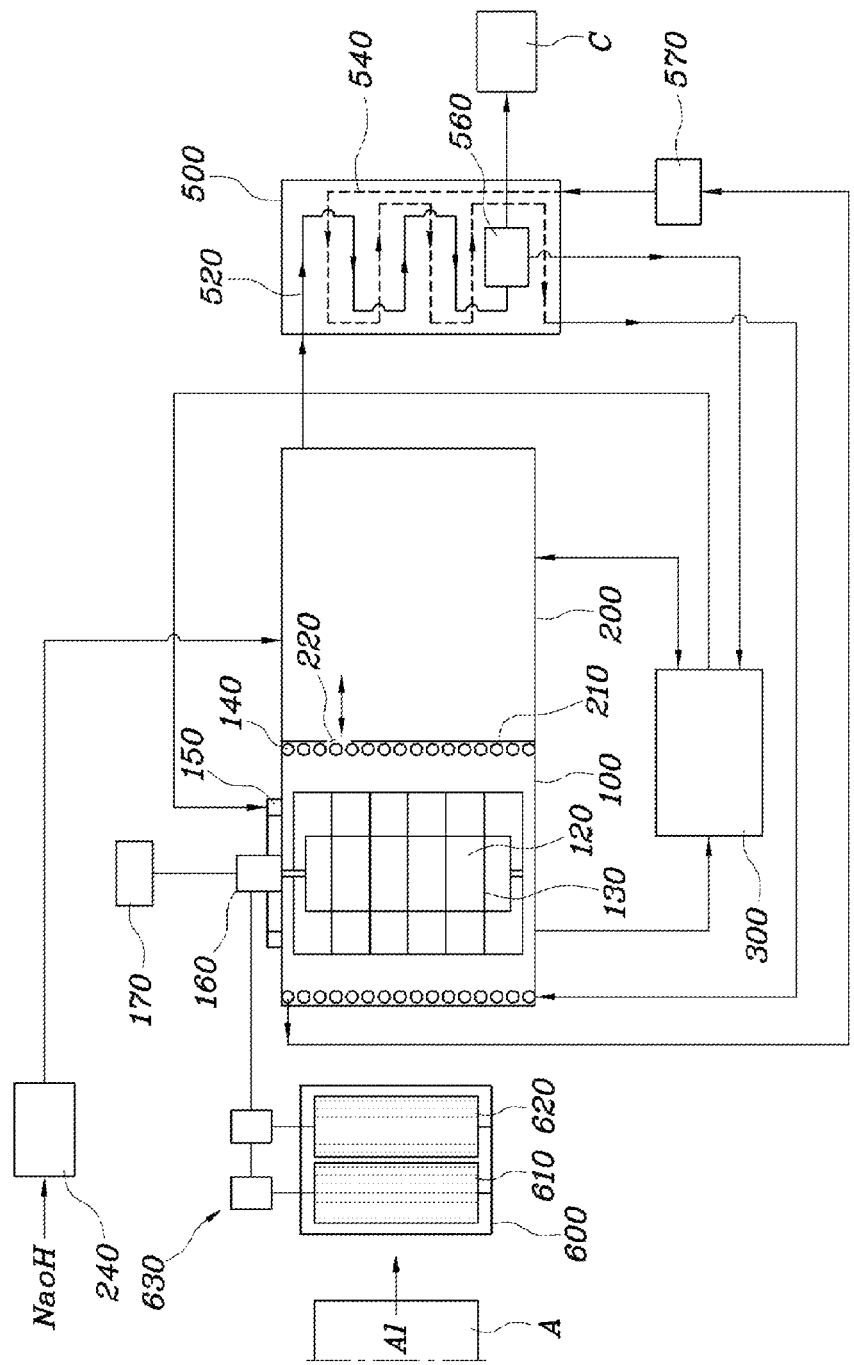
FIG. 1 is a diagram illustrating the configuration of an apparatus for producing fuel for a fuel cell car according to an exemplary embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Ranges provided herein are understood to be shorthand for all of the values within the range. For example, a range of 1 to 50 is understood to include any number, combination of numbers, or sub-range from the group consisting of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50, as well as all intervening decimal values between the aforementioned integers such as, for example, 1.1, 1.2, 1.3, 1.4, 1.5, 1.6, 1.7, 1.8, and 1.9. With respect to sub-ranges, "nested sub-ranges" that extend from either end point of the range are specifically contemplated. For example, a nested sub-range of an exemplary range of 1 to 50 may comprise 1 to 10, 1 to 20, 1 to 30, and 1 to 40 in one direction, or 50 to 40, 50 to 30, 50 to 20, and 50 to 10 in the other direction.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

As described above, in order to overcome the defects of the high-pressure hydrogen container used in a convention hydrogen supply system for a fuel cell, it is desirable to develop an on-board hydrogen production system. Such an on-board production system may use a chemical reaction (e.g., aluminum and caustic soda) to produce hydrogen.

The technologies of the related art have not been commercially used for vehicles and developing a hydrogen supply system for constantly supplying power and has been proposed in KR 10-2008-0030919A. The apparatus described therein is characterized by a powder type of raw material that is filled in a mesh, positioned in a powder container, and comes in contact with a NaOH aqueous solution in a first reactor vessel. The following reaction is induced from the apparatus:

$$Al+3H2O+NaOH=NaA(OH)4+1.5H2 \quad (1),$$

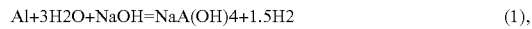

which results in the production of hydrogen. The apparatus was designed to maintain the atmosphere of the liquid by measuring the concentration of NaOH with a PH meter in order to keep the reaction speed constant. However, this conventional solutions suffers from a drawback in that it is difficult to control the reaction due to the NaOH aqueous solution remaining in the powder when stopping the production of hydrogen.

The present invention overcomes this problem by allowing on-board hydrogen production in a manner in which the hydrogen producing reaction can be controlled when stopping/restarting the production of hydrogen, as described in detail below.

Figure 2:
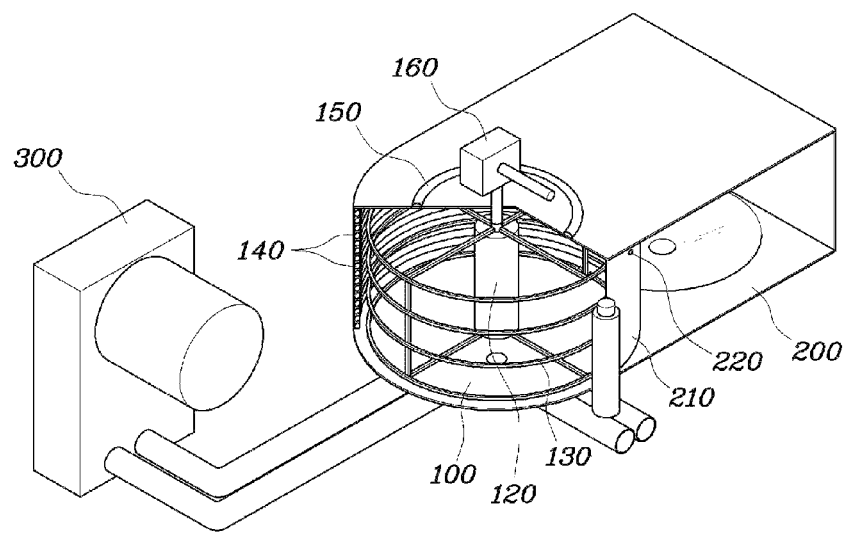
FIG. 2 is a view illustrating a main reaction chamber of the apparatus for producing fuel for a fuel cell car illustrated in FIG. 1.
Figure 3:
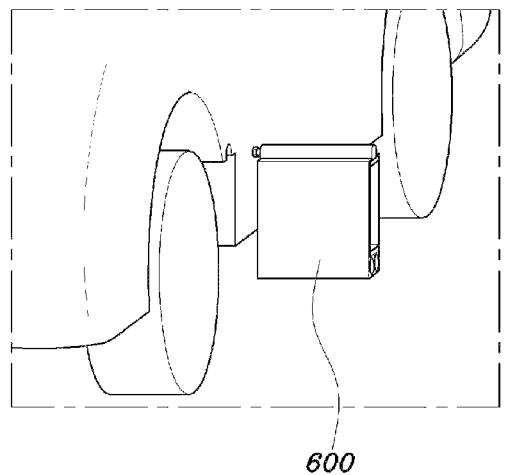
FIGS. 3 and 4 are views illustrating a supplier of the apparatus for producing fuel for a fuel cell car.
Figure 4:
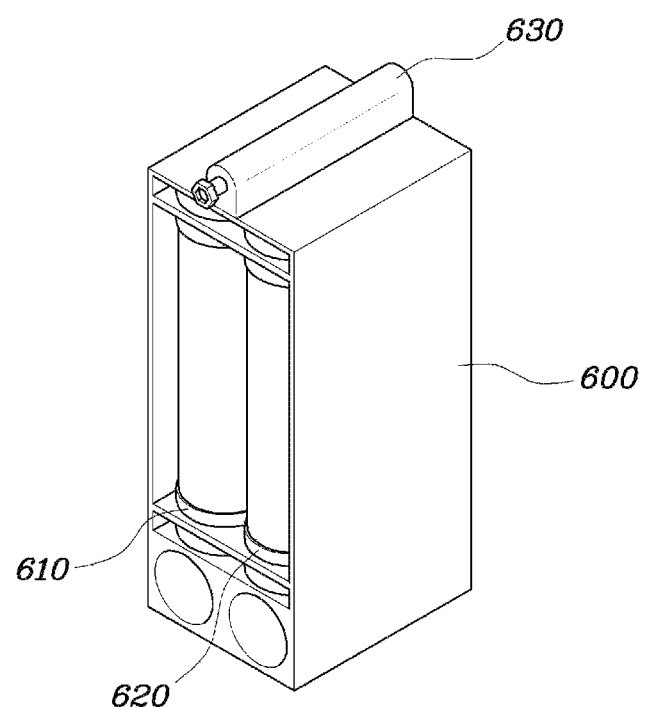

An apparatus for producing fuel for a fuel cell car according to an embodiment of the present invention is described hereafter with reference to the accompanying drawings. FIG. 1 is a diagram illustrating the configuration of an apparatus for producing fuel for a fuel cell car according to an exemplary embodiment of the present invention, FIG. 2 is a view illustrating a main reaction chamber of the apparatus for producing fuel for a fuel cell car illustrated in FIG. 1, and FIGS. 3 and 4 are views illustrating a supplier of the apparatus for producing fuel for a fuel cell car.

An apparatus for producing fuel for a fuel cell car of the present invention includes: a main reaction chamber 100 that includes a built-in aluminum coil; a sub-chamber 200 that contains a sodium aqueous solution and is connected with the main reaction chamber 100 to pass a produced gas; a circulation pump 300 that supplies a sodium hydroxide aqueous solution in the sub-chamber 200 to the main reaction chamber 100 when producing fuel, and returns the sodium hydroxide aqueous solution in the main reaction chamber 100 to the sub-chamber 200 when stopping the producing; and a separator 500 that is connected with the main reaction chamber 100 or the sub-chamber 200, separates the hydrogen gas from the other gases in the produced gas, and supplies the hydrogen gas to a fuel cell C.

The apparatus for producing fuel for a fuel cell car of the present invention is an apparatus that produces and supplies only the necessary amount of hydrogen in real time by receiving aluminum and a sodium hydroxide aqueous solution, and may fundamentally prevent dangerous factors such as charging and storing hydrogen.

The apparatus for producing fuel for a fuel cell car of the present invention may be disposed on the underside of the lower floor of a vehicle, and in detail, may be composed of the main reaction chamber 100 where a hydrogen production reaction occurs and the sub-chamber 200 containing a sodium hydroxide aqueous solution.

The main reaction chamber 100 may include a built-in aluminum coil that is coiled around an aluminum panel A, and in detail, is composed of a winding member 120 that winds a coil while rotating at the center and a restriction frame 130 that restricts the thickness of the wound coil, formed in a frame shape surrounding the edge of the winding member 120. The restriction frame 130 restricts the entire diameter of the coil that is wound so that the most coil is wound, and the concentration of the coil gradually increases.

The apparatus for producing fuel for a fuel cell car of the present invention further includes a supplier 600 that receives and bends the aluminum panel A in a zigzag shape in the cross-section and supplies the bent aluminum panel A to the main reaction chamber 100.

As illustrated in FIGS. 3 and 4, the supplier 600 is composed of two gears 610 and 620 and bends the cross-section of the aluminum panel A in a zigzag shape through the two gears 610 and 620. A driving body 630 that rotates the two gears 610 and 620 may extend from a driving gear 160 that rotates the winding member 120 in the main reaction chamber 100 and the driving gear 160 may receive torque transmitted from a specific driving unit 170.

That is, the main reaction chamber 100 includes the winding member 120 that winds a coil while rotation at the center, and the two gears 610 and 620 of the supplier 600 and the winding part 120 operates together by power transmitted from the driving unit 170, so that the work is performed by pulling and removing out the aluminum coil from a gas station, bending a new aluminum panel in an arc shape through the supplier, winding the aluminum panel around the winding member, and storing it in the main reaction chamber.

Further, the sodium hydrogen aqueous solution in the sub-chamber 200 may be replaced with a new solution through a replacing pump 240 in the station in this process.

As described above, the apparatus for producing fuel for a fuel cell car of the present invention can easily and safely fill and discharge an aluminum raw material, which should be considered when producing hydrogen from a chemical reaction.

On the other hand, an injection nozzle 150 may be formed around the winding member 120 on the top of the main reaction chamber 100 and connected with the circulation pump 300 such that it receives a sodium hydrogen aqueous solution and injects it into the main reaction chamber 100 toward the aluminum coil, from above. Therefore, it is possible to quickly produce hydrogen by rapidly injecting a sodium hydroxide and to use the maximize the contact area between the sodium hydrogen aqueous solution and the aluminum coil to as great an extent as possible, so that it is possible to take a measure by rapidly producing fuel, if necessary.

Further, a separation wall 210 is disposed between the main reaction chamber 100 and the sub-chamber 200 and flow holes 220 are formed at the upper portion of the separation wall 210 such that the produced gases in the main reaction chamber 100 and the sub-chamber 200 may flow to each other and the pressures in the chambers may be balanced. Therefore, load is exerted in the circulation pump 300 to as small an extent as possible, so that sodium hydrogen can be rapidly supplied or returned.

On the other hand, water that is a byproduct from the fuel cell C returns into the separator 500 to recycle the water to be wasted, and the remaining gas in the produced gas in the main reaction chamber 100 is separated from the hydrogen gas by liquefying and supplied with the water into the circulation pump 300.

Vapor and sodium hydroxide vapor due to the reaction of the sodium hydrogen aqueous solution and the aluminum may be contained in the remaining gas, and they are liquefied by liquefying and separated from the hydrogen gas by a separating filter 560, and then the hydrogen gas is supplied to the fuel cell C as fuel, and the remaining gas is liquefied and supplied back to the sub-chamber 200 to be recycled.

Meanwhile, the separator 500 has a refrigerant line 540 for liquefying the remaining gas, the main reaction chamber 100 has a cooling line 140 for cooling the inside, and the refrigerant line 540 and the cooling line 140 are connected with each other such that a refrigerant can circulate. Further, the cooling line 140 may be a pipe shape that circulates along the inner wall of the main reaction chamber 100.

For this configuration, a separate heat exchanger 570 is provided in a vehicle or the lines are disposed through a heat exchanger mounted on a vehicle such that the cooled refrigerant liquefies the remaining gas in a supply line 520 connected to the sub-chamber 200 while passing through the cooling line 540 of the separator 500, returns through the cooling line 140 of the main reaction chamber 100 to recover reaction heat of the main reaction chamber 100, and then is cooled through the heat exchanger 570, thereby recovering the reaction heat and collecting the remaining gas at the same time.

As described above, since the aluminum coil in the main reaction chamber 100 may be replaced and the sodium hydrogen aqueous solution in the sub-chamber 200 may be replaced, the apparatus for producing fuel for a fuel cell car can be implemented in the on-board type that can be mounted on a vehicle, provide convenience for the user, and freely control the hydrogen production speed.

Further, it is possible to easily and safely fill and discharge fuel, which should be considered when producing hydrogen from a chemical reaction, and easily control the reaction when stopping/restarting producing hydrogen.

According to the apparatus for producing fuel for a fuel cell car having the configuration described above, the apparatus may be implemented in an on-board type that can be mounted on a vehicle, provide convenience for the user, and freely control the hydrogen production speed.

Further, it is possible to easily and safely fill and discharge fuel, which should be considered when producing hydrogen from a chemical reaction, and easily control the reaction when stopping/restarting producing hydrogen.

Although the present invention was described with reference to specific embodiments shown in the drawings, it is apparent to those skilled in the art that the present invention may be changed and modified in various ways without departing from the scope of the present invention, which is described in the following claims.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. An apparatus for producing fuel for a fuel cell car comprising:
   a main reaction chamber including an aluminum coil and configured to produce gas;
   a sub-chamber including a sodium aqueous solution, the sub-chamber connected to the main reaction chamber to allow the produced gas to flow between the sub-chamber and the main reaction chamber;
   a circulation pump configured to supply a sodium hydroxide aqueous solution in the sub-chamber to the main reaction chamber when producing the fuel, and further configured to return the sodium hydroxide aqueous solution in the main reaction chamber to the sub-chamber when stopping production of the fuel; and
   a separator configured to separate hydrogen gas from the produced gas, and supply the hydrogen gas to a fuel cell,
   wherein the main reaction chamber includes a winding member and a restriction frame, the winding member configured to wind a coil while rotating at the center and the restriction frame configured to restrict the thickness of the wound coil.

2. The apparatus of claim 1, further comprising a supplier configured to receive and bend an aluminum panel in a zigzag shape and supply the bent aluminum panel to the main reaction chamber.

3. The apparatus of claim 2, wherein the supplier comprises two gears and bends the cross-section of the aluminum panel in a zigzag shape between the two gears.

4. The apparatus of claim 3, wherein the two gears of the supplier and the winding member operate together by power transmitted from a driving unit.

5. The apparatus of claim 1, wherein an injection nozzle is formed around the winding member on the top of the main reaction chamber and is connected with a circulation pump to receive a sodium hydrogen aqueous solution and inject into the main reaction chamber toward the aluminum coil.

6. The apparatus of claim 1, wherein a separation wall is disposed between the main reaction chamber and the sub-chamber, and flow holes are formed at the upper portion of the separation wall such that the produced gases in the main reaction chamber and the sub-chamber flow to each other and the pressures in the chambers are balanced.

7. The apparatus of claim 1, wherein water that is a byproduct from a fuel cell reaction returns into the separator, and the remaining gas in the produced gas is separated from the hydrogen gas by liquefying and supplied with the water into the circulation pump.

8. The apparatus of claim 1, wherein the separator has a refrigerant line for liquefying the remaining gas, the main reaction chamber has a cooling line for cooling the inside, and the refrigerant line and the cooling line are in fluid communication with each other such that a refrigerant circulates.

9. The apparatus of claim 8, wherein the cooling line is a pipe shape that circulates along the inner wall of the main reaction chamber.

10. The apparatus of claim 1, wherein the aluminum coil in the main reaction chamber is replaceable and the sodium hydrogen aqueous solution in the sub-chamber is replaceable.

* * * * *